United States Patent [19]

Meyers et al.

[11] Patent Number: 4,604,605

[45] Date of Patent: Aug. 5, 1986

[54] SAFETY DEVICE FOR MANUALLY OPERABLE CODE GENERATION

[76] Inventors: Pierre Meyers, Nimrodstr. 7A, Ottobrunn; Klaus Meister, Am Fischerwinkel 3, Grünwald, both of Fed. Rep. of Germany

[21] Appl. No.: 581,052

[22] Filed: Feb. 17, 1984

[30] Foreign Application Priority Data

May 10, 1983 [DE] Fed. Rep. of Germany ....... 3317112

[51] Int. Cl.[4] .............................................. G06F 3/02

[52] U.S. Cl. ................................ 340/365 R; 200/333; 200/46; 340/365 A

[58] Field of Search ........ 340/365 R, 365 S, 365 VL, 340/365 A, 365 P, 365 E, 711, 712; 364/189, 700, 705, 709, 710; 200/333, 334, 46; 235/145 R, 146, 1 D

[56] References Cited

U.S. PATENT DOCUMENTS

| | | | |
|---|---|---|---|
| 3,950,634 | 4/1976 | Speiser | 235/145 R |
| 3,954,085 | 5/1976 | Nassimbene | 235/145 R |
| 4,283,714 | 8/1981 | Trenkler et al. | 340/365 S |
| 4,359,619 | 11/1982 | Bergoltz | 200/333 |
| 4,431,882 | 2/1984 | Frame | 340/365 C |
| 4,439,647 | 3/1984 | Calandrello et al. | 340/365 R |
| 4,439,757 | 3/1984 | Gross et al. | 340/365 R |
| 4,443,789 | 4/1984 | Endfield et al. | 340/365 R |
| 4,501,936 | 2/1985 | Morse | 200/333 |
| 4,508,402 | 4/1985 | Tomino et al. | 340/711 |
| 4,509,873 | 4/1985 | Ryan | 340/365 R |

FOREIGN PATENT DOCUMENTS 2950680 12/1979 Fed. Rep. of Germany .

*Primary Examiner*—Gerald L. Brigance
*Assistant Examiner*—Mahmoud Fatahi-Yar
*Attorney, Agent, or Firm*—Karl F. Ross; Herbert Dubno

[57] ABSTRACT

A base with a keyboard for the manual generation of data combinations, e.g. of a code serving to release a lock of a door on which the keyboard is accessibly mounted, has one or more wipers impregnated with a nonvolatile film of liquid such as silicone oil. The wipers are carried on a lid which is pivotally or slidably attached to the base; movement of the lid, or of a detent holding it in closure position, causes the wipers to sweep across coplanar pressure faces of the keyboard and remove any finger marks that could be used by a would-be trespasser to help breaking down the code. The pressure faces are areas of a flexible foil having a rough outer surface for retaining part of the film of liquid spread thereover; the foil may comprise a porous layer underlain by a spongy layer storing some of that liquid.

12 Claims, 9 Drawing Figures

SAFETY DEVICE FOR MANUALLY OPERABLE CODE GENERATION

FIELD OF THE INVENTION

Our present invention relates to a code generator to be used for manually producing a binary data combination to be fed into a decoder for the electronic control of a load, such as the unlocking of a door.

BACKGROUND OF THE INVENTION

In our copending application Ser. No. 581,178, filed on even date herewith, we have disclosed a decoding unit, located inside a room, which responds to a predetermined entry code fed in from the outside and matching a reference code stored in a memory of that unit in order to release a door-locking mechanism. As described in that concurrently filed application, the entry code can be generated by a keyboard on a device of the type here considered. The term "keyboard", as used here, encompasses not only an array of individually depressible keys or pushbuttons (such as the 12-button panels commonly used in telephones of the "touch-tone" type) but also assemblies wherein a frame is spanned by a flexible foil or membrane bearing markings on its outer surface which designate certain areas as pressure faces whose depression will close a set of underlying contacts; see, for example, German laid-open application No. 29 50 680 published June 19, 1981. The areas so designated as pressure faces, together with their associated contacts, can therefore also be referred to as keys.

In order to generate a certain code consisting of a predetermined number of bits, the user must actuate these keys in a prescribed manner. With a 24-bit code as described in our copending application, for example, the keyboard has six rows of four bits each and the user depresses in each row the key or keys corresponding to bits of a given logical value (either "0" or "1") in a respective 4-bit word. The words so generated are stored in a register and, after selection is completed, are jointly read out to the decoder on a multiplicity of leads, 24 of them in the example referred to.

A problem with such a keyboard resides in the possibility that an unauthorized person, such as a potential intruder, might be able to determine with the aid of known fingerprint-revealing methods which keys of a keyboard had recently been operated. A widely used technique for the detection of fingerprints resides in spreading a powder of contrasting color over the keyboard. New fingerprints are also readily recognizable if the keyboard had been previously treated with a degreasing solvent for the removal of old prints.

Especially in situations where the keys used to generate a certain code are to be depressed only once and where the sequence of their operation is not critical, a person resorting to these techniques could readily reconstruct the code giving access to a locked room.

This problem has been recognized in the above-identified German application which proposes to solve it by replacing the fixed markings on the pressure faces of the keys by controllable indicators of the liquid-crystal or light-emitting-diode type forming randomly variable symbols. The user, guided by the alphanumerical or other characters appearing at that particular time, will then generate the requisite data combination by the depression of keys in a sequence or pattern different from that required for the same code at an earlier or later occasion.

While the known system is undoubtedly effective to prevent the successful duplication of a secret code by an unauthorized observer, its implementation is expensive; also, the generation of the code is time-consuming since the user must always search for the new loaction of any key to be actuated.

OBJECT OF THE INVENTION

The object of our present invention, therefore, is to provide a simple solution for the aforestated problem which practically eliminates the risk of unauthorized duplication of a code by the tracing of fingermarks without altering the relative positions of keys marked by alphanumerical or other symbols.

SUMMARY OF THE INVENTION

The code generator according to our invention comprises a keyboard whose keys have substantially coplanar pressure faces, the base of the keyboard being provided with a cover which is movable into a nonoperating position overlying these pressure faces when the device is not being used. The cover is provided with one or more wipers which are arranged to sweep over the pressure faces of the keys upon a displacement of the cover between the nonoperating positon and an operating position giving access to the keys. A nonvolatile and preferably nonaqueous liquid of long-lasting character, resistant to removal by solvents, is carried by the wiper or wipers to form a continuous film on the pressure faces which will be present thereon whenever they become accessible.

Silicone oils are particularly suitable for this purpose.

When the pressure faces are exposed by a removal of the cover to the operating position, the actuation of any key will of course leave a fingerprint on the wetted face thereof. The print, however, will be destroyed when the user thereafter moves the cover into the nonoperative position, giving rise to a wiper sweep over the keyboard surfaces. Such a sweep will also occur upon a subsequent reversal of the cover motion to expose a keyboard for a new data emission.

The wiper or wipers need not be fixedly mounted on the cover but could be carried thereon through the intermediary of a relatively movable detent which must be displaced in order to latch the cover in its closure or nonoperating position. The latching and unlatching will again result in two wiper sweeps across the pressure faces.

Although our invention is generally applicable to all keyboards with substantially coplanar pressure faces, we prefer to employ it in combination with keyboards of the continuous-foil type since the foil or membrane will itself serve as a reservoir for some of the film-forming liquid. For this purpose it is desirable to provide the foil with a rough outer surface able to retain substantial quantities of the liquid. That surface could be formed by a porous layer, such as a netting or fabric, underlain by a spongy layer which is impregnated with some of the liquid to serve as an additional supply. Reimpregnation will then be necessary only infrequently.

BRIEF DESCRIPTION OF THE DRAWING

The above and other features of our invention will now be described in detail with reference to the accompanying drawing in which.

SPECIFIC DESCRIPTION

Figure 1:
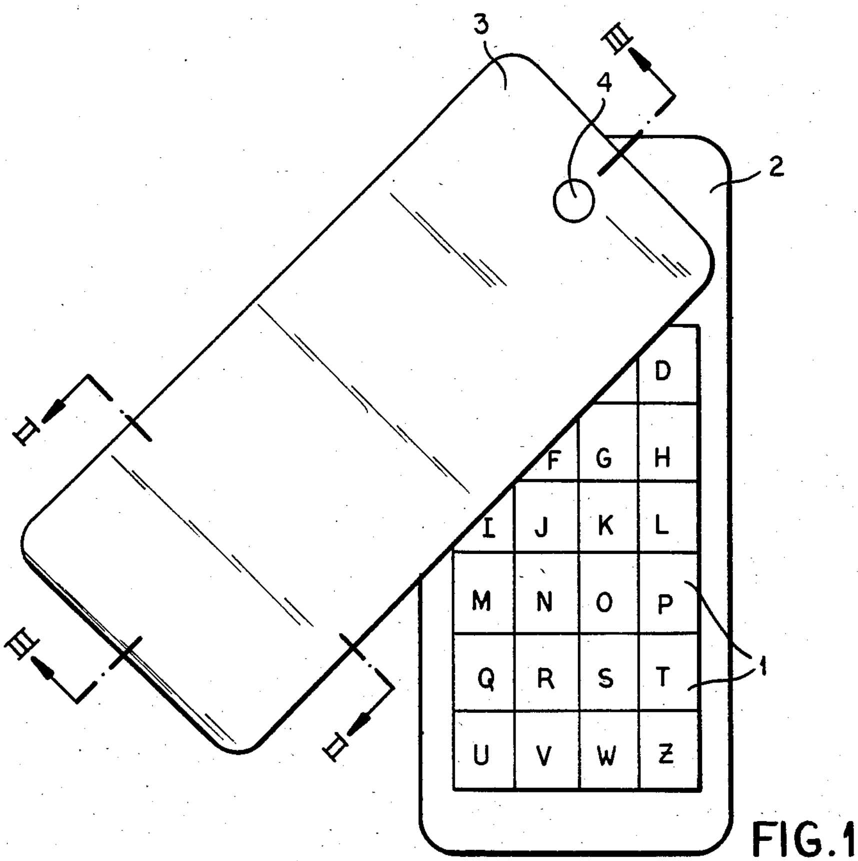
FIG. 1 is a face view of a code generator according to our invention, having a cover partly swung out.
Figure 3:
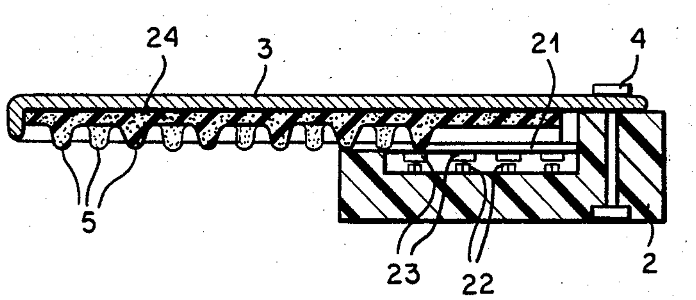
FIG. 3 is a longitudinal sectional view of the cover and part of the base of the code generator, taken on the line III—III of FIG. 1.
Figure 2:
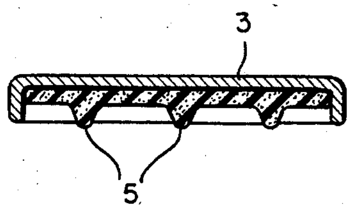
FIG. 2 is a cross-sectional view of the cover, taken on the line II—II of FIG. 1.

In FIGS. 1-3 we have shown a code generator according to our invention comprising a base 2 provided with a keyboard formed by a flexible foil 21. The foil overlies a space in which pairs of stationary contacts 22 are bridgeable by countercontacts 23 on its underside whenever a pressure face 1 of the foil is being manually depressed. In the embodiment illustrated, there are 24 pressure faces 1 arrayed in an orthogonal matrix of four columns and six rows. These faces are individually marked by letters A-W and Z (see also FIG. 6) and are aligned with the respective contacts 23.

FIG. 1 shows the keyboard with its pressure faces 1 partly overlain by a cover 3 which is swingable about a pivot 4, relatively to base 2, in a plane parallel to that of foil 21. The cover position of FIG. 1 is an intermediate one between a nonoperating position, in which all faces 1 are obstructed, and an operating position in which they are all accessible. The cover may be retained in either of its limiting positions simply by friction or by nonillustrated stops and detents.

The underside of cover 3 carries a layer 24 of sponge rubber or the like which is impregnated with a nonvolatile film-forming liquid, specifically a silicone oil, and has numerous downwardly projecting protuberances 5 serving to distribute that liquid over the surface of foil 21 when the cover is swung clockwise—as viewed in FIG. 1—into the operating position or counterclockwise into the nonoperating position of the device. Upon exposure of the keyboard in the operating positions, a film of that liquid is uniformly spread over the coplanar pressure faces 1. Disturbances of that film upon the depression of any face 1 to close the underlying set of contacts 22, 23 are eliminated upon the subsequent return swing of the cover so as not to be traceable when the keyboard is again exposed.

It will be understood that base 2 contains the necessary circuitry for temporarily storing the combination of data words generated by the selective depression of certain pressure faces 1. A set of output leads extending to an associated decoding unit, e.g. past a door to be unlocked by the generated code as described in our concurrently filed application, have not been illustrated.

Figure 5:
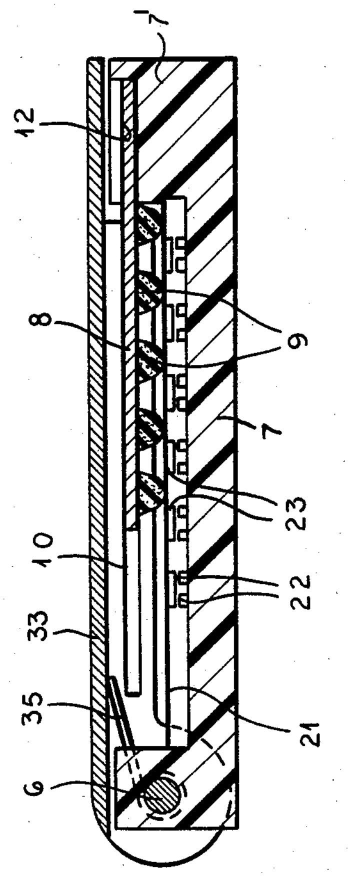
FIG. 5 is a longitudianl sectional view of the device of FIG. 4, taken on the line V—V of FIG. 4.
Figure 4:
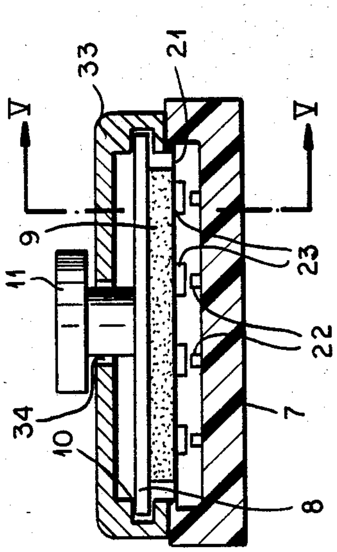
FIG. 4 is a cross-sectional view of a similar code generator provided with a different cover structure.

FIGS. 4 and 5 show another embodiment in which a base 7, spanned by a foil 21 of a keyboard with fixed and movable contacts 22 and 23, is provided with a cover 33 having two lateral grooves 10 in which a sheet-metal plate 7 is slidable with the aid of a knob 11 passing through slot 34 in the cover. A sill 7′ of base 7 has grooves 12 (only one shown) which are in line with the grooves 10 of the cover and are enterable by the plate 8 in a latching position illustrated in FIG. 5 in order to hold the cover 33 down onto the base 7, thereby making the pressure faces of its keys inaccessible. Cover 33, which is swingable about a transverse pivot pin 6 at the opposite end of base 7, is biased toward an open position by a spring 35 wound about pivot pin 6.

Plate 8, serving as a detent, carries on its underside a plurality of wipers 9 in the form of sponge-rubber strips impregnated with a film former such as silicone oil sweeping along foil 21 when that detent is either advanced or retracted to latch the cover 33 in its illustrated position and to unlatch it when a user desires to operate the keyboard. Wipers 9, of course, could also form part of a continuous layer as illustrated in FIGS. 2 and 3.

Figure 8:
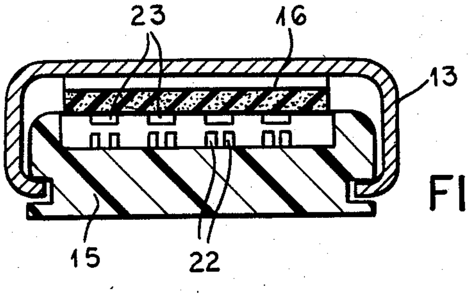
FIG. 8 is a cross-sectional view taken on the line VIII—VIII of FIG. 7.
Figure 6:
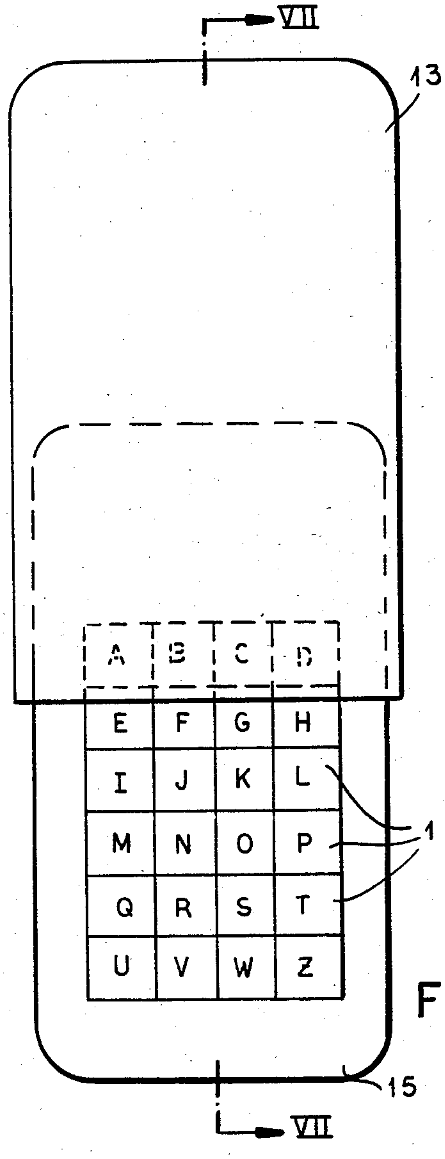
FIG. 6 is a face view of a further code generator embodying our invention.
Figure 7:
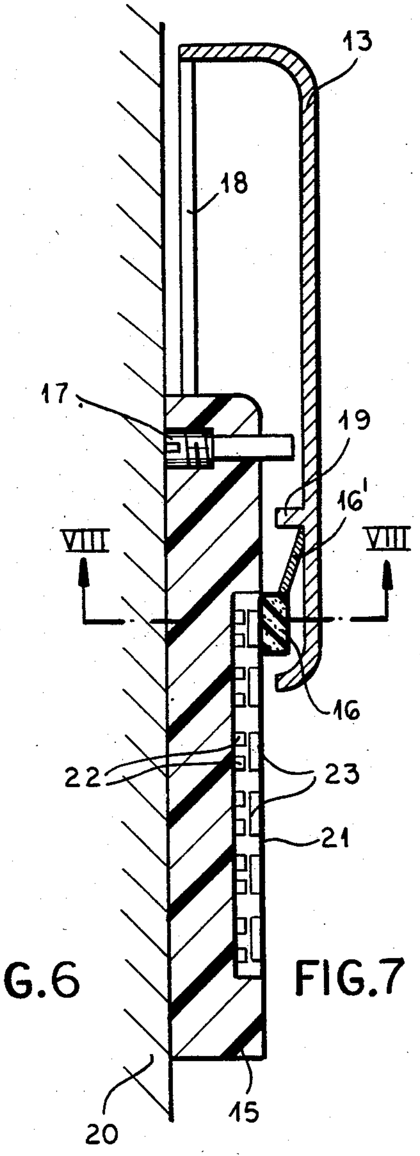
FIG. 7 is a longitudinal sectional view of the device of FIG. 6, taken on the line VII—VII thereof.

The embodiment of FIGS. 6-8 comprises a base 15, with keyboard-forming foil 21 and contacts 22, 23, across which a cover 13 is longitudinally slidable with the aid of guide rods 18 (only one shown) received in nonillustrated parallel bores of base 15. The outward motion of the cover is limited by a rib 19 abutting a stop 17 which is formed by a pin threaded from the rear into a hole of the base. With that base fastened to a supporting surface such as a door 20, the pin 17 will not be extractable from its hole so that cover 13 could not be detached from the base. A sponge 16, carried on the inner surface of cover 13 by an elastic blade 16′, sweeps over the array of pressure faces 1 when the cover is moved either down or up to conceal or to expose the keyboard.

Figure 9:
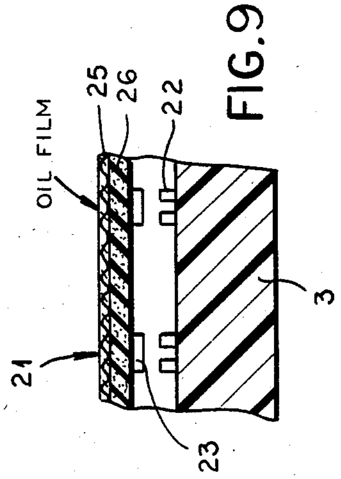
FIG. 9 is a sectional detail view illustrating part of a contact-carrying foil for any of the code generators shown in the preceding Figures.

In FIG. 9 we have illustrated a preferred structure for the foil 21 whose thickness relative to that of base 3 has here been exaggerated for clarity. The foil 21 comprises a porous layer 25 underlain by a sponge layer 26, both layers storing part of the silicone oil which is to form a film on the upper surface of the foil. The supply of oil in these layers and in the associated wipers, while not inexhaustible, will last for an extended period during which the keyboard can be operated a large number of times.

We claim:

1. In a code generator for the emission of combinations of digital data, comprising a base with a keyboard having manually operable keys with substantially coplanar pressure faces, the combination therewith of a cover movably secured to said base for overlying said keyboard in a nonoperating position, said cover being provided with wiper means arranged to sweep over said pressure faces upon a displacement of said cover between said nonoperating position and an operating position giving access to said keys, said wiper means carrying a nonvolatile liquid forming a continuous film on said pressure faces upon a sweep thereof by said wiper means.

2. The combination defined in claim 1 wherein said wiper means comprises a plurality of spongy members impregnated with said liquid, said members projecting from said cover to the plane of said pressure faces.

3. The combination defined in claim 2 wherein said cover is swingable between said operating and nonoperating positions about an axis perpendicular to said plane.

4. The combination defined in claim 3 wherein said cover is slidable between said operating and nonoperating positions on a track parallel to said plane.

5. The combination defined in claim 4 wherein said track is formed by a longitudinal bore in said base receiving a rod secured to said cover, said base being provided with a stop preventing a complete withdrawal of said rod from said bore and defining the operating position of said cover, said stop being retractable from a rear surface of said base to enable a separation of said cover therefrom, such retraction being normally prevented by a support adjoining said rear surface.

6. The combination defined in claim 1 wherein said cover is provided with a detent means for latching the same in said nonoperating position, said wiper means being coupled with said detent means for sweeping over said pressure faces upon an unlatching movement of said detent means to release said cover preparatorily to a displacement thereof to said operating position.

7. The combination defined in claim 6 wherein said cover is provided with a spring means tending to move the same into said operating position upon a release thereof by said detent means.

8. The combination defined in claim 7 wherein said cover is hinged to said base for swinging about an axis parallel to said plane between said operating and nonoperating positions.

9. The combination defined in claim 1 wherein said pressure faces are marked areas of a flexible foil overlying a set of contacts in said base.

10. The combination defined in claim 9 wherein said foil has a rough outer surface capable of retaining part of said liquid.

11. The combination defined in claim 9 wherein said foil comprises a porous layer underlain by a spongy layer impregnated with some of said liquid.

12. The combination defined in claim 1 wherein said liquid is a silicone oil.

* * * * *